F. E. BERRY.
APPARATUS FOR USE IN THE DISTRIBUTION OF ELECTRIC CURRENTS.
APPLICATION FILED MAY 6, 1911.
1,010,410.
Patented Dec. 5, 1911.
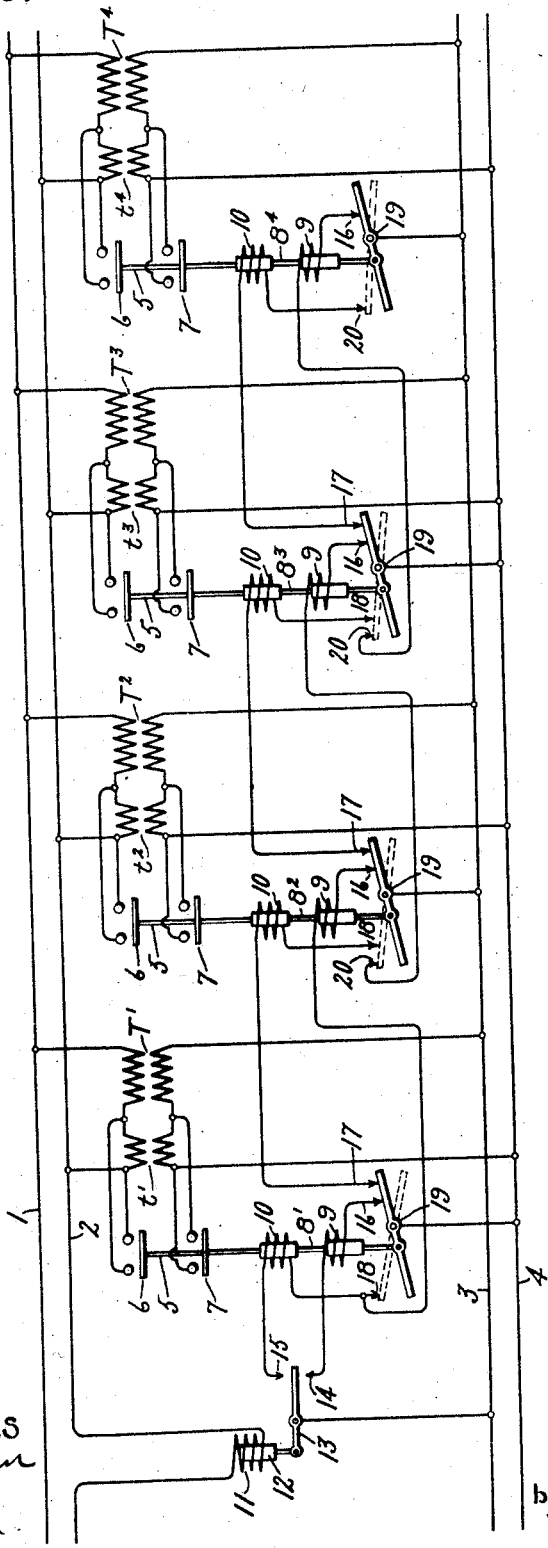
Witnesses
inventor.
Frederick E. Berry.
by
His Attorney.

UNITED STATES PATENT OFFICE.

FREDERICK E. BERRY, OF HAYES, ENGLAND, ASSIGNOR TO GENERAL ELECTRIC COMPANY, A CORPORATION OF NEW YORK.

APPARATUS FOR USE IN THE DISTRIBUTION OF ELECTRIC CURRENTS.

1,010,410.   Specification of Letters Patent.   Patented Dec. 5, 1911.

Application filed May 6, 1911. Serial No. 625,534.

*To all whom it may concern:*

Be it known that I, FREDERICK E. BERRY, a subject of the King of Great Britain, residing at Hayes, county of Middlesex, England, have invented certain new and useful Improvements in Apparatus for Use in the Distribution of Electric Currents, of which the following is a specification.

My invention relates to improvements in apparatus for use in the distribution of electric currents, comprising systems wherein electric energy is supplied alternately to one or another of two groups or series of devices, and it has for its object to provide means whereby the individual devices of each group are automatically brought into use in succession.

My invention has been particularly devised for use in the distribution of alternating currents with the aid of main and supplementary transformers, as set forth, for example, in the specification of British Letters Patent No. 2096 of 1904.

In accordance with my invention, I employ a plurality of main transformers and a corresponding number of supplementary transformers, there being a supplementary transformer for each main transformer, the primary and secondary windings of each set of main and supplementary transformers being normally connected in series and across primary supply and secondary distributing mains in the well known manner.

The object of my invention is the construction of a device which may be used where it is desired to operate a series of switches successively, and more particularly one which shall permit a number of such sets of transformers to be operated in parallel and, by means of a suitable relay, which may be operated automatically or by hand, when the load on the transformers exceeds a predetermined amount, to short circuit the primary and secondary windings of the supplementary transformers and to open the short circuits when the load on the transformers falls below a predetermined amount.

I accomplish the object of my invention by employing for each set of transformers a separate switch mechanism which has in operative relation with it electromagnetic devices having energizing windings for closing and opening the switches, and, by an arrangement of connections, whereby, when the first switch of the series has either of its windings energized by its operation, the similar windings for the other switches will be successively energized and thus the switches will be closed or opened.

The further novelties of my invention are pointed out with more particularity in the claims appended to and made a part of this specification.

For a further understanding of my invention, reference may be had to the accompanying drawing which shows diagrammatically the circuits and connections which I employ.

Referring now to the drawing, I have shown my invention as applied to four sets of transformers, comprising main transformers $T^1$, $T^2$, $T^3$, $T^4$, with primary and secondary windings respectively connected in series to the similar windings of auxiliary transformers $t^1$, $t^2$, $t^3$, $t^4$.

1 and 2 are the high tension supply mains across which the primary windings of these sets of transformers are normally connected in series, and 3 and 4 are the secondary distributing mains across which the secondary windings of these sets of transformers are normally connected in series. When the load upon the transformers exceeds a predetermined amount, the secondary and primary windings of the auxiliary transformers are short circuited by means of switch mechanisms 5, having switches 6 and 7 for simultaneously short circuiting respectively the primary and secondary windings of the auxiliary transformers in the well known manner. In operative relation with these switches are electromagnetic mechanisms $8^1$, $8^2$, $8^3$, $8^4$ having closing and opening windings 9, 10, these windings being arranged so that, when the closing windings 9 are energized, they will pull up and close switches 6 and 7, and, when the opening windings 10 are energized, they will open the same switches. A relay 11 is arranged with its energizing winding energized by a current proportional to the current flowing in the primary mains and having in operative relation with it a core 12 connected to a contact lever 13 arranged to work between fixed contacts 14, 15. Contact lever 13 is connected to distributing conductor 3. One end of the closing winding 9 of the first switch mechanism $8^1$ is connected to contact 14 and the other end to contact 16 in operative relation with contact lever 19, which is operated by the action of the electromagnetic mechanism $8^1$, as will be seen from an inspection of the drawing. This lever is connected to conductor 4 and in operative relation therewith are contacts 16 connected to one end of the closing winding 9 of this mechanism and 17 which is connected, as shown, to the opening winding 10 of the second mechanism $8^2$, and contact 18 connected to one end of the closing winding of mechanism $8^2$ and of the opening winding of mechanism $8^1$.

Referring now to the second mechanism $8^2$, which operates to short circuit the auxiliary transformer $t^2$ of the second set of transformers $T^2$, $t^2$, it will be observed that the switching mechanism and the connections of the closing and opening windings therefor are in general similar to those of mechanism $8^1$, contact lever 19 however being connected to conductor 3 and in its normal position as shown by the full lines making contact with one end of its closing winding and one end of the opening winding of the succeeding mechanism $8^3$ by means of contacts 16 and 17, and in its closed position as shown by the dotted lines making contact with contact 18 connected to one end of its opening winding and contact 20 connected to one end of the closing winding 9 of the succeeding switch mechanism $8^3$. The remaining switch mechanisms $8^3$, $8^4$ may be connected as shown, contact levers 19 being alternately connected to conductors 3 and 4 as shown, and it will be obvious that while I have described my invention as applied to four transformers, it may equally well be applied to a greater number of transformers, the connections being made in a manner similar to those which I have described.

The principle upon which my invention operates is as follows: Normally the windings of the supplementary transformers are open circuited as shown and the relay 11 may be in the position shown or make contact with contact 15. When the load upon the transformers exceeds a predetermined amount the core 12 of relay 11 will be pulled up, thus causing a contact between lever 13 and contact 14. When this contact takes place, closing winding 9 of the first mechanism $8^1$ will be energized, as current will flow from conductor 3 to lever 13, contact 14, winding 9, contact 16, lever 19, to conductor 4. This will cause this mechanism to close switches 6 and 7, short circuiting the primary and secondary windings of auxiliary transformer $t^1$ and throw lever 19 in the position shown by the dotted lines, where it makes contact with contact 18. When this contact is completed, winding 9 of the second switch mechanism $8^2$ will be energized, current flowing from conductor 4 through lever 19 of mechanism $8^1$, contact 18, closing winding 9 of mechanism $8^2$, contact 16, lever 19 of mechanism $8^2$ and conductor 3. The energizing of this winding will cause mechanism $8^2$ to operate, short circuit the primary and secondary windings of the auxiliary transformer $t^2$ and move its lever 19 in the position shown by the dotted lines so as to make contact with contacts 18 and 20, when the succeeding mechanism $8^3$ will have its closing winding energized in a manner similar to that described, causing it to operate and close its switches 6, 7 and in turn operate mechanism $8^4$. It will thus be seen that by the operation of relay 11, the closing winding of the first switch is energized, which causes the closing windings of the other switches to be successively energized, each switch by its movement energizing the closing winding of the succeeding switch.

When the several switches are closed and their contact levers 19 are in the positions shown by the dotted lines, it will be observed that the circuits of the closing windings are opened but that these contact levers make connection with ends of the opening windings 10 of said switches. If now the load on the transformers falls below a predetermined amount, core 12 of relay 11 will drop, causing lever 13 to make contact with contact 15. This will energize the opening winding 10 of mechanism $8^1$, current flowing from conductor 3 through lever 13, contact 15, winding 10, contact 18, lever 19, to conductor 4. Its switches 6 and 7 will then open and its contact lever 19 make contact with contact 17, when opening winding 10 of mechanism $8^2$ will be energized, current flowing from conductor 4, through lever 19 of mechanism $8^1$, contact 17, winding 10, contact 18 and lever 19 of mechanism $8^2$ to conductor 3. This will cause this mechanism $8^2$ to operate and open and by its movement its contact lever 19 will assume the position shown by the full lines, thus energizing the opening winding 10 of mechanism $8^3$, causing it to operate and in turn operate mechanism $8^4$. It will thus be seen that when the current falls below a predetermined amount, relay 11 will operate to energize the opening winding of the first mechanism $8^1$, so that when this winding opening the first switch is energized, the opening windings of the other switches are successively energized and the connections will be as shown, the auxiliary transformers being in operative relation with the windings in series with those of the main transformer across the supply and distributing conductors, and with contact levers 19 of the various switch mechanisms, in such a position that the operation of relay 11 upon an overload will reënergize the closing windings of these mechanisms and successively operate the same.

It will be obvious that while I have illustrated relay 11 as automatically operated, the same may be operated by hand if desired, and that further my invention is not limited to use with transformers alone but may be used where it is desired to operate successively a plurality of switches to be used for any purpose.

While I have described a preferred embodiment of my invention, I do not limit myself to this embodiment, but seek in the appended claims to cover all embodiments which shall be obvious to those skilled in the art and not depart from the spirit of my invention.

What I claim as new and desire to secure by Letters Patent of the United States, is,—

1. A switch mechanism for operating a plurality of devices in succession, comprising a plurality of switches, electromagnetic mechanism in operative relation with each switch having closing and opening windings adapted when energized to close and open the same, supply mains, connections between said mains and the windings closing said switches arranged so that when the closing winding of the first switch is energized the closing windings of the other switches are successively energized, and means in operative relation with the switches arranged so that when the winding opening the first switch is energized the opening windings of the other switches are successively energized.

2. A switch mechanism for operating a plurality of devices in succession, comprising a plurality of switches, electromagnetic mechanism in operative relation with each switch having closing and opening windings adapted when energized to close and open the same, supply mains, connections between said mains and the windings closing said switches arranged so that when the closing winding of the first switch is energized the closing windings of the other switches are successively energized, means in operative relation with the switches arranged so that when the winding opening the first switch is energized the opening windings of the other switches are successively energized, and a relay adapted to energize alternately the closing and opening winding of the first switch.

3. In combination, supply and distributing conductors, a plurality of sets of main and supplementary transformers, the primary and secondary windings of each set normally connected in series and across the primary and distributing mains respectively, a plurality of switches adapted to simultaneously and successively short circuit the primary and secondary windings of each of the supplementary transformers, electromagnetic mechanism in operative relation with each switch having closing and opening windings adapted when energized to close and open the same, connections between the conductors and the closing windings arranged so that when the closing winding of the first switch is energized the closing windings of the other switches are successively energized, and means in operative relation with the mechanisms arranged so that when the opening winding of the first switch is energized the opening windings of the other switches are successively energized.

4. In combination, supply and distributing conductors, a plurality of sets of main and supplementary transformers, the primary and secondary windings of each set normally connected in series and across the primary and distributing mains respectively, a plurality of switches adapted to simultaneously and successively short circuit the primary and secondary windings of each of the supplementary transformers, electromagnetic mechanism in operative relation with each switch having closing and opening windings adapted when energized to close and open the same, connections between the conductors and the closing windings arranged so that when the closing winding of the first switch is energized the closing windings of the other switches are successively energized, means in operative relation with the mechanisms arranged so that when the opening winding of the first switch is energized the opening windings of the other switches are successively energized, and a relay adapted to energize the closing winding of the first switch when the load on the transformers exceeds a predetermined amount and to energize the opening winding of the first switch when the load on the transformers falls below a predetermined amount.

In witness whereof, I have hereunto set my hand this twenty-fourth day of April, 1911.

FREDERICK E. BERRY.

Witnesses:
Jos. Goodman,
Maurice A. V. London.